United States Patent [19]

Thiemann, III

[11] Patent Number: 4,904,118

[45] Date of Patent: Feb. 27, 1990

[54] STRUCTURE FOR VIEWING AN UNDERWATER ENVIRONMENT

[76] Inventor: Henry J. Thiemann, III, P.O. Box 14292, So. Lake Tahoe, Calif. 95702

[21] Appl. No.: 214,695

[22] Filed: Jun. 30, 1988

Related U.S. Application Data

[63] Continuation-in-part of Ser. No. 933,402, Nov. 20, 1986, abandoned.

[51] Int. Cl.$^4$ .................... B63C 11/00; E02D 29/00
[52] U.S. Cl. .................... 405/195; 405/194; 52/81; 52/169.1
[58] Field of Search ............ 405/8, 185, 188, 189, 405/194, 195, 203–205, 207–210, 224, 227; 114/66, 314; 52/169.1, 244, 81, 82, 86

[56] References Cited

U.S. PATENT DOCUMENTS

| 385,656 | 7/1888 | Belisle | 114/66 |
|---|---|---|---|
| 530,398 | 12/1894 | Cooper | 405/190 |
| 819,317 | 5/1906 | Shrewsbury | 405/195 |
| 902,898 | 11/1908 | Newhall | 52/27 |
| 1,016,808 | 2/1912 | Williamson | 405/194 |
| 1,017,486 | 2/1912 | Williamson | 405/194 X |
| 1,223,515 | 4/1917 | Papanastasiou | 98/30 |
| 1,313,838 | 8/1919 | Stodder | 405/195 |
| 2,582,723 | 1/1952 | Stemmons et al. | 52/81 |
| 2,820,990 | 1/1958 | Johnson | 52/82 X |
| 2,935,854 | 5/1960 | Thompson et al. | 405/204 |
| 3,240,186 | 3/1966 | Dobell | 119/1 |
| 3,254,621 | 6/1966 | White | 114/66 |
| 3,527,184 | 9/1970 | McCarty et al. | 405/185 X |
| 3,624,702 | 11/1971 | Meehen | 405/227 |
| 3,680,515 | 8/1972 | Yoneda | 114/66 |
| 3,754,403 | 8/1973 | Mott et al. | 405/208 X |
| 3,895,495 | 7/1975 | Akazaki et al. | 114/66 X |
| 3,896,628 | 7/1975 | Hansen | 405/207 |
| 3,943,871 | 3/1976 | Tanaka | 114/66 |
| 4,058,945 | 11/1977 | Knapp | 405/185 X |
| 4,087,980 | 5/1978 | Kono | 405/188 |
| 4,092,811 | 6/1978 | Lin et al. | 52/244 X |
| 4,094,160 | 6/1978 | Galerne | 405/185 |
| 4,186,532 | 2/1980 | Kahn | 405/194 X |
| 4,497,594 | 2/1985 | Fern | 405/203 X |

FOREIGN PATENT DOCUMENTS

| 1348284 | 4/1964 | France . | |
| 423864 | 7/1947 | Italy . | |
| 564843 | 7/1957 | Italy . | |
| 51693 | 4/1980 | Japan | 114/66 |
| 10616 | 1/1986 | Japan | 405/205 |
| 22335 | of 1914 | United Kingdom | 114/66 |
| 119532 | 10/1918 | United Kingdom | 405/194 |

Primary Examiner—Randolph A. Reese
Assistant Examiner—John A. Ricci
Attorney, Agent, or Firm—Townsend and Townsend

[57] ABSTRACT

A structure for observing a marine environment comprising a housing affixed to a bottom of a body of water, such as an ocean floor, and extending toward and above the surface of the water. A reception area is disposed near the top of the housing and a walkway extends from the reception area to the bottom of the housing. The walkway defines a spiral adjacent to the inner wall of the housing, and a plurality of windows are disposed on the side of the housing between successive levels of the spiral. An aquarium disposed on the bottom of the housing, spaced radially inward from the housing and extending toward the top of the housing defines with the walkway, the side of the housing and the bottom of the housing a substantially enclosed passage extending for a substantial length along the bottom of the housing for simulating the underwater environment. A substantially transparent extension may be disposed on the housing so that a person disposed within the extension is substantially enveloped by the underwater environment.

19 Claims, 13 Drawing Sheets

STRUCTURE FOR VIEWING AN UNDERWATER ENVIRONMENT

CROSS REFERENCES TO RELATED APPLICATIONS

This is a continuation-in-part of copending application Ser. No. 06/933,402, filed 11/20/86, now abandoned.

BACKGROUND OF THE INVENTION

1. Field Of The Invention

The invention relates to building structures and, more particularly, to a structure extending a substantial length below the surface of a body of water for viewing the underwater environment from inside the structure.

2. Description Of The Relevant Art

Many cities and towns have structures which display specimens of marine life for educating and entertaining the public. Typically, the structures house a plurality of relatively small aquariums, each aquarium displaying one or more species of marine life. Although such places allow visitors to view marine lifeforms that they otherwise may never see, the viewing environment is much like that of a museum, and the observers are unable to appreciate the environment in which the creatures are found. As a result, the educational and entertainment experience is incomplete, To provide a more realistic setting for viewing marine life, some structures contain large annular aquariums which surround the visitors. These annular aquariums are intended to provide the visitors with an overwhelming sensation of the vastness of the open seas. Unfortunately, these structures fall short of their intended effect. Visitors easily may see to the other side of the aquarium, and they know that they are merely visiting an isolated structure surrounded by parking lots and/or other buildings. Since the visitors know that the civilized world is merely beyond the external walls of the building, the museum-like feeling of the entire experience can not be overcome.

SUMMARY OF THE INVENTION

The present invention is directed to a structure for viewing an actual underwater environment. In one embodiment of the present invention, a housing is affixed to a support and extends for a substantial length below the surface of a body of water. Preferably, the housing is affixed to the bottom of the body of water, such as an ocean floor, and extends toward and above the surface of the water. The entrance to the housing is near the top of the housing above the surface of the water, and a walkway extends to a lower portion of the housing. The walkway defines a spiral adjacent the inner wall of the housing so that people may view their descent through windows disposed along the side of the housing. The interior of the spiral should be empty to provide people with a better appreciation of the depth to which they are descending.

To further enhance the experience, the bottom of the housing simulates the underwater environment by having a substantially enclosed passage formed proximate the walls of the housing and preferably bounded by aquariums disposed radially inward of the housing walls. The outer boundary of the passage thus provides a view of the natural underwater environment, whereas the inner boundary of the passage simulates a continuation of that underwater environment, so that visitors are led to believe that they are walking through a conduit located at the bottom of the ocean, rather than through a museum. The view of the descent and the enclosed passage provides an element of excitement, mystery, and reality which is heretofore unknown in present structures.

To maximize the viewing experience, a substantially transparent extension may be disposed on the housing so that a person disposed within the extension is substantially enveloped by the underwater environment. In this embodiment, access to the extension may be through a transparent tunnel extending to the shore.

DETAILED DESCRIPTION OF THE PREFERRED EMBODIMENTS

Figure 1:
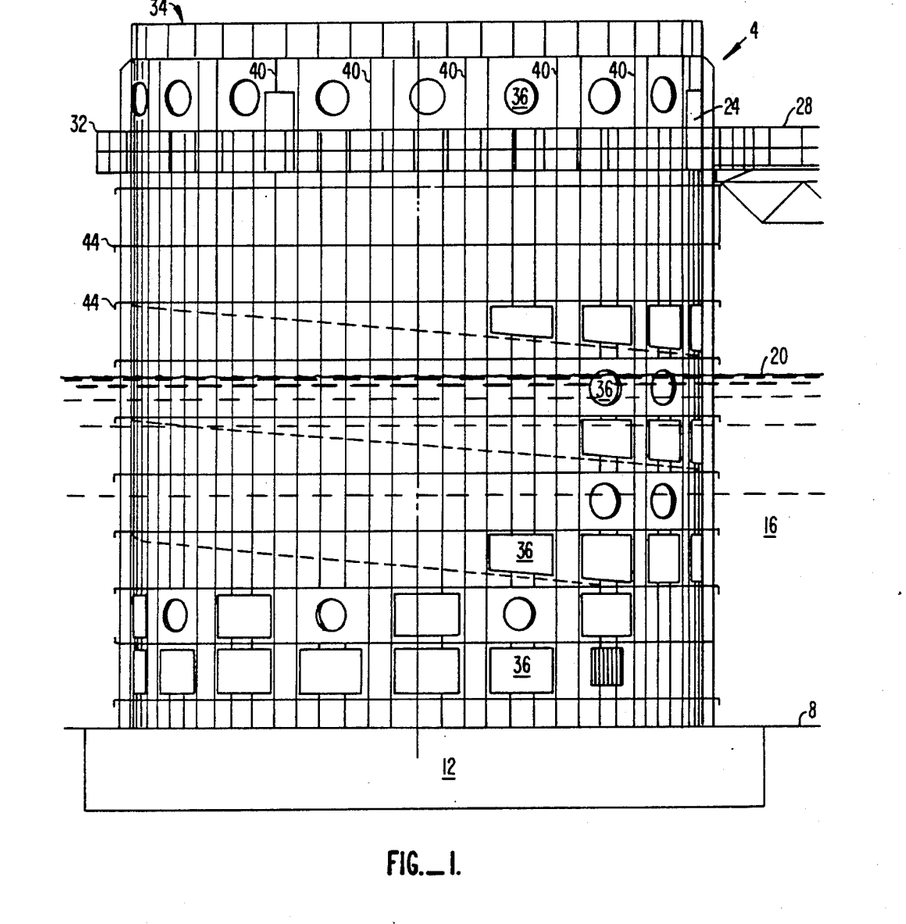
FIG. 1 is a side view of a structure for observing a marine environment according to the present invention.

FIG. 1 is a side view of a structure 4 for observing an underwater environment according to the present invention. Structure 4 comprises a housing 6 which may be affixed to an underwater surface 8 through a foundation 12 if the buoyancy, waterflow, or ground characteristics of the surrounding area make the use of such a foundation desirable. Details of foundation 12 are described below.

Underwater surface 8 preferably is disposed at a bottom of a body of water 16 which may be a river, lake, bay, sea, ocean, or any other body of water which lends itself to an educational or entertaining viewing experience. Housing 6 extends for a substantial length below a surface 20 of body of water 16 and may extend toward and above surface 20 for ease of access.

Housing 6 includes a door 24 or other means for allowing people to enter into structure 4 after walking or riding over an access structure 28, which, in this embodiment, is a bridge or a pier. A plurality of windows 36 are disposed along the side of the housing, especially beneath surface 20, so that people may view the underwater environment from inside the housing. Windows 36 may be of any shape or size feasible for the given body of water, e.g., square, round, trapezoidal, large, small, thick, thin, etc. Some of the windows 36 may be hemispherical or otherwise project from the side of structure 4 so that people may view the side area immediately adjacent the housing.

To enhance the enjoyment of the visitors, a catwalk 32 extends along the perimeter of housing 6 so that visitors may view the environment above the water. A similar catwalk may be disposed beneath the surface 20 so that divers or swimmers may congregate and provide further viewing pleasure to people inside the structure. Structure 4 also may include an observation deck 34 located at the top thereof.

Because structure 4 may be disposed in very large bodies of water, housing 6 preferably is built to withstand the waves and currents that may exist in those environments. Accordingly, housing 6 includes a frame comprising vertical stiffeners 40, preferably extending from underwater surface 8 to observation deck 34, and horizontal stiffeners 44, which are connected to vertical stiffeners 40 and extend along the perimeter of housing 6.

Another factor which must be compensated for is that structure 4, in those embodiments where it is a substantially hollow structure, has a buoyant tendency. This buoyant tendency sometimes makes it difficult to maintain structure 4 affixed to underwater surface 8, especially when the depth of water is substantial. The problem is further aggravated in conditions of strong currents and waves. Accordingly, the present invention preferably is coupled with a foundation. Although foundation 12 may comprise a solid slab or other conventional foundation, preferably, the embodiments of foundation 12 illustrated in FIGS. 2a, 2b, 3a, 3b, 4a, and 4b are used.

Figure 2A:
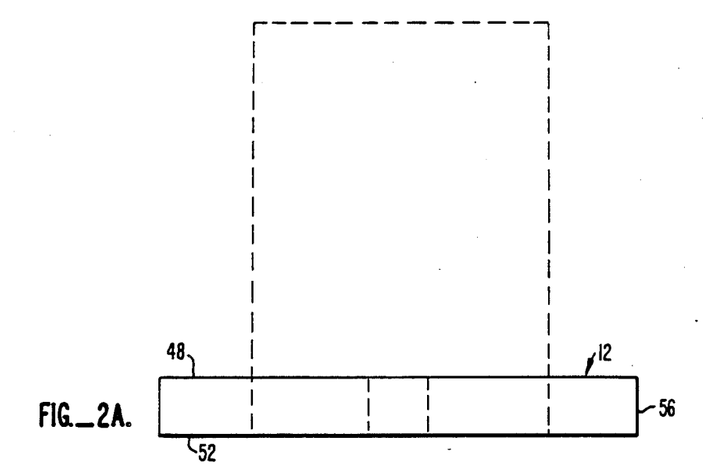
FIGS. 2a and 2b are side and plan views, respectively, of one embodiment of a foundation for the structure of FIG. 1.
Figure 2B:
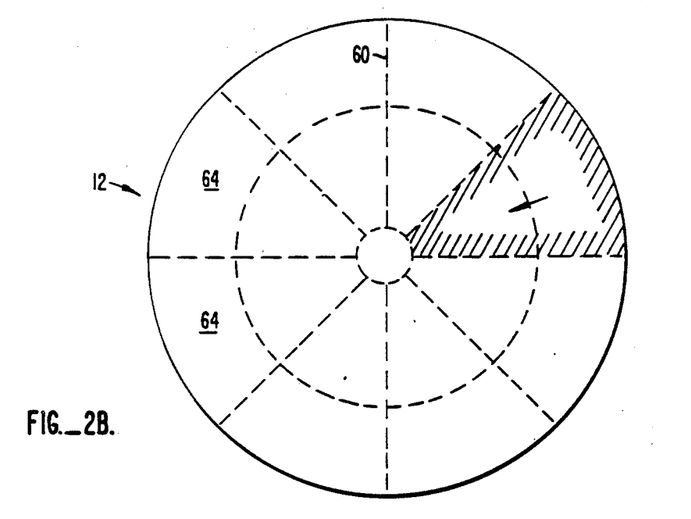

When structure 4 is disposed in smaller lakes and other generally tranquil bodies of water, the foundation shown in FIGS. 2a and 2b may be used if a separate foundation is necessary at all. As shown in FIG. 2a, foundation 12 comprises an upper foundation member 48, a lower foundation member 52, and a peripheral wall 56. Peripheral wall 56 is disposed between and spaces apart upper foundation member 48 and lower foundation member 52, and it extends along the perimeters thereof. As shown in FIG. 2b, a plurality of radially extending wall members 60 are disposed between the upper and lower foundation members, and they are connected to peripheral wall 56 for forming a plurality of ballast chambers 64 for receiving a ballast material having a density not less than that of water.

Figure 3A:
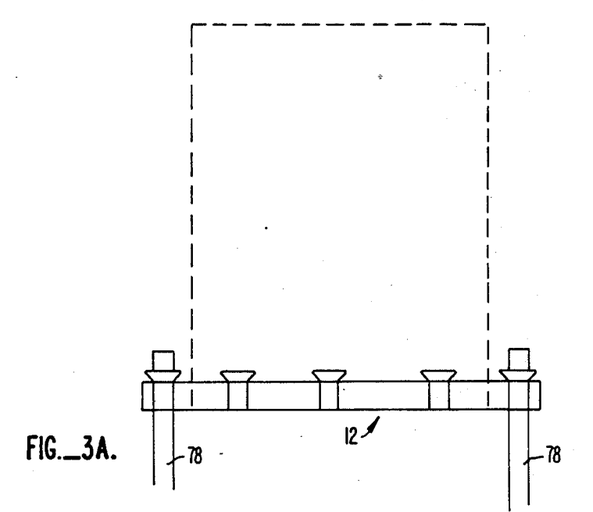
FIGS. 3a and 3b are side and plan views, respectively, of a second embodiment of a foundation for the structure of FIG. 1.
Figure 3B:
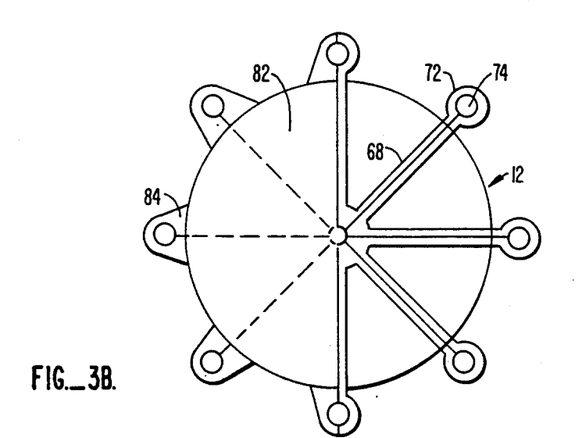

In situations where the underwater environment is more hostile, or whenever the foundation illustrated in FIGS. 2a and 2b is undesirable, the foundation illustrated in FIGS. 3a and 3b may be used. In this embodiment, foundation 12 comprises a plurality of radially extending members 68, each radially extending member 68 having a generally cylindrical sleeve 72 affixed to the end thereof for defining an aperture 74 for receiving a fastening member such as piling 78 therethrough. Each radially extending member 68 and corresponding sleeve 72 are preferably constructed of steel, and the entire assembly may be embedded in concrete or steel for forming a casing 82. Alternatively, radially extending members 68 may be omitted and foundation 12 formed as a slab having flanges 84 as shown in FIG. 3b.

Figure 4A:
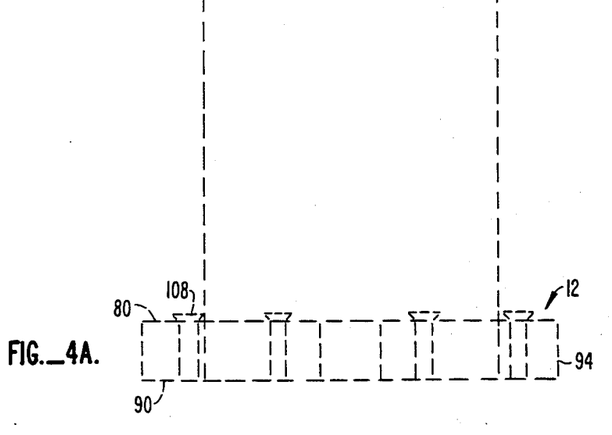
FIGS. 4a and 4b are side and plan views, respectively, of a third embodiment of a foundation for the structure of FIG. 1.
Figure 4B:
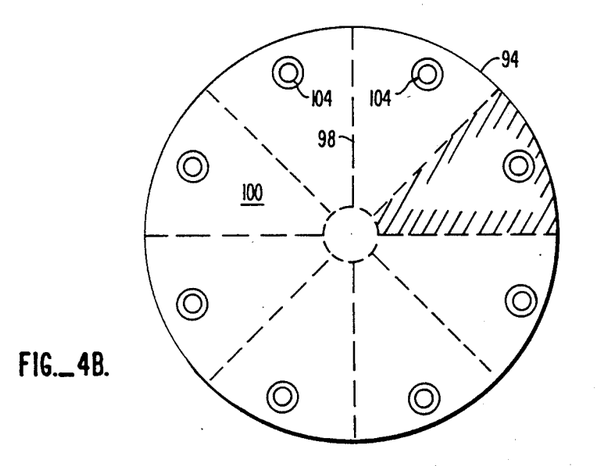

For very severe environments, or if desirable for other reasons, a hybrid embodiment of foundation 12, illustrated in FIGS. 4a and 4b, may be used. In this embodiment, foundation 12 comprises an upper foundation member 86, a lower foundation member 90, and a peripheral wall 94. Peripheral wall 94 is disposed between and spaces apart upper foundation member 86 and lower foundation member 90, and it extends along the perimeters thereof. A plurality of radially extending wall members 98 are disposed between upper foundation member 86 and lower foundation member 94, and they are connected to peripheral wall 94 for forming a plurality of chambers 100 (similar to chambers 64 illustrated in FIG. 2b) for receiving a ballast material having a density not less than that of water. Foundation 12 further includes a plurality of sleeves 104 radially disposed proximate peripheral wall 94 for defining an aperture 106 for receiving a corresponding plurality of pilings 108 therethrough.

Figure 5:
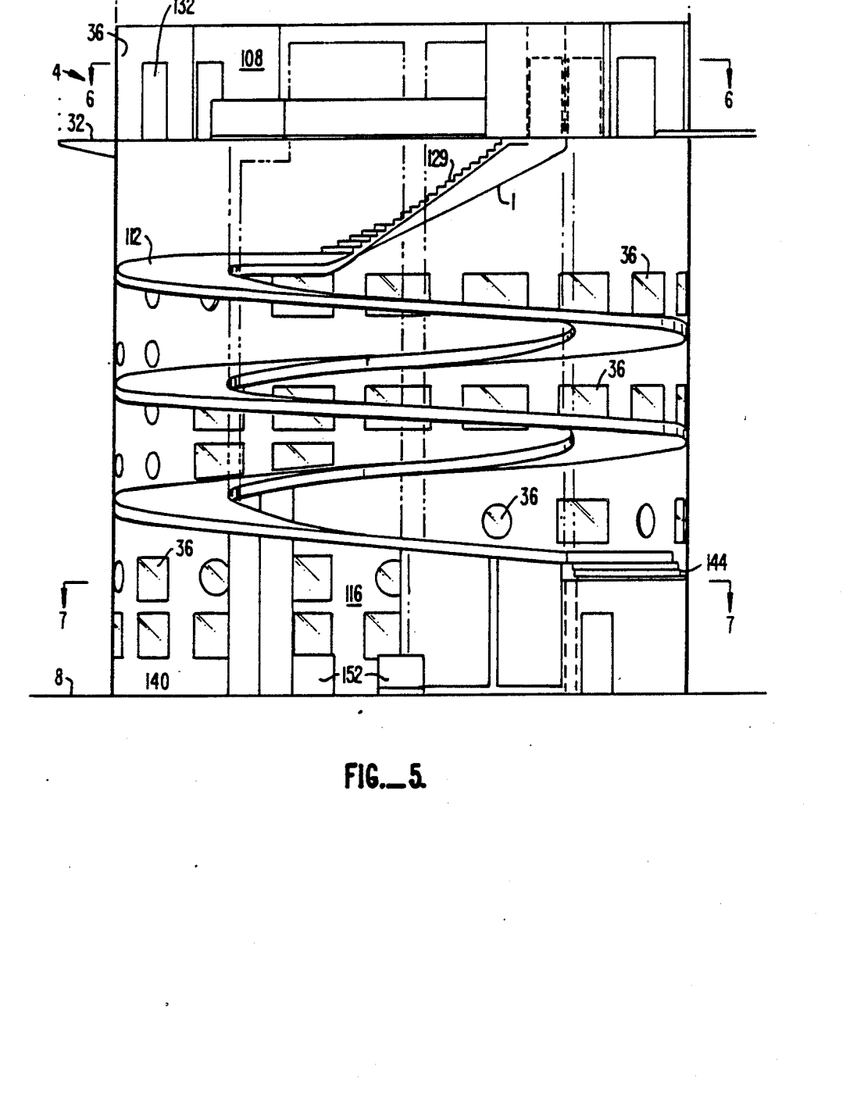
FIG. 5 is a side view of the structure of FIG. 1 with the front of the housing removed for showing the interior of the structure according to the present invention.

FIG. 5 is a side view of structure 4 with the front part of housing 6 removed for showing the interior. As shown in FIG. 5, structure 4 includes a reception area 108 for greeting visitors, a walkway 112 for transporting the visitors to a lower portion of the housing, and a bottom portion 116.

Figure 6:
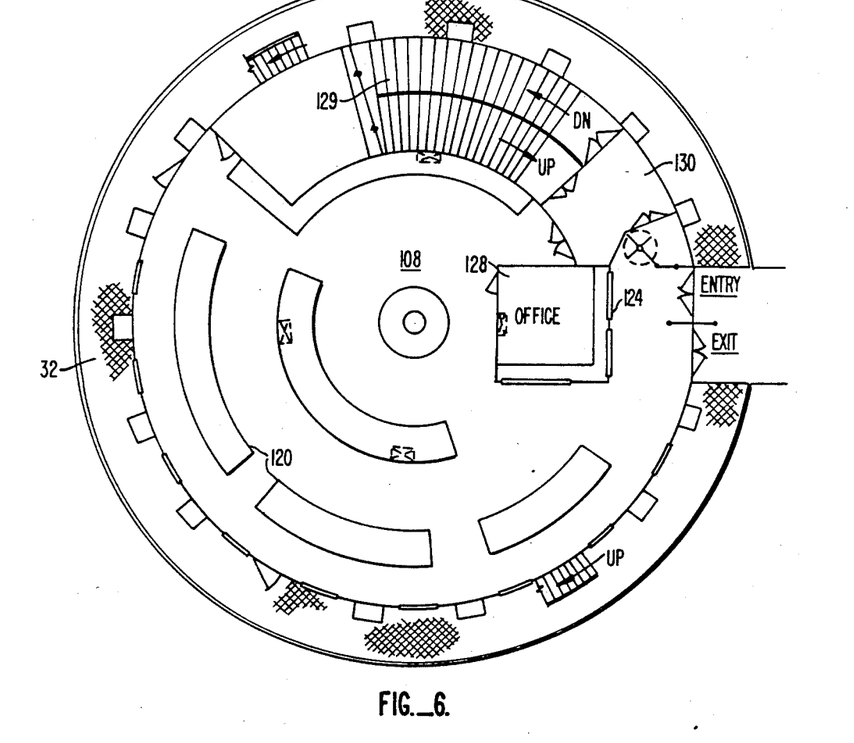
FIG. 6 is a plan cross-sectional view of the structure according to the invention taken along line 6—6 of FIG. 5.

Reception area 108 serves as an entry and exit point for visitors. As shown in FIG. 6, reception area 108 may include a plurality of merchandise counters and/or aquariums 120, a ticket booth 124, and a personnel office 128. Reception area 108 further includes an upper staircase 129 leading to or forming a part of walkway 112 and a light lock 130 for preventing the ambient light in reception area 108 from entering lower portions of structure 4. Reception area 108 may include other features, such as educational exhibits, lecture presentation areas, etc. to make the visit more enjoyable.

Preferably, catwalk 32 is disposed at the same level as reception area 108 so that visitors may easily access the catwalk through doors 132 (FIG. 5). Visitors also may view the outside from reception area 108 through windows 36.

As shown in FIG. 5, upper staircase 129 connects reception area 108 to walkway 112. Walkway 112 is disposed adjacent the inner wall of housing 6 and descends as a spiral of constant radius toward bottom portion 116. Preferably, the interior of the spiral is substantially empty so that visitors may see bottom portion 116 and form an awareness of the depth to which they will descend. This will produce a feeling of apprehension in some visitors, further increasing their enjoyment. A guard rail (not shown) preferably extends along the inner edge of the walkway for safety, and windows 36 are disposed along successive levels of the spiral so that visitors may view the underwater environment as they descend. Walkway 112 may be replaced with stairs, elevators, or any other means of transporting people to bottom portion 116, and walkway 112 need not take the form of a spiral if such a configuration is undesirable for one reason or another.

Figure 7:
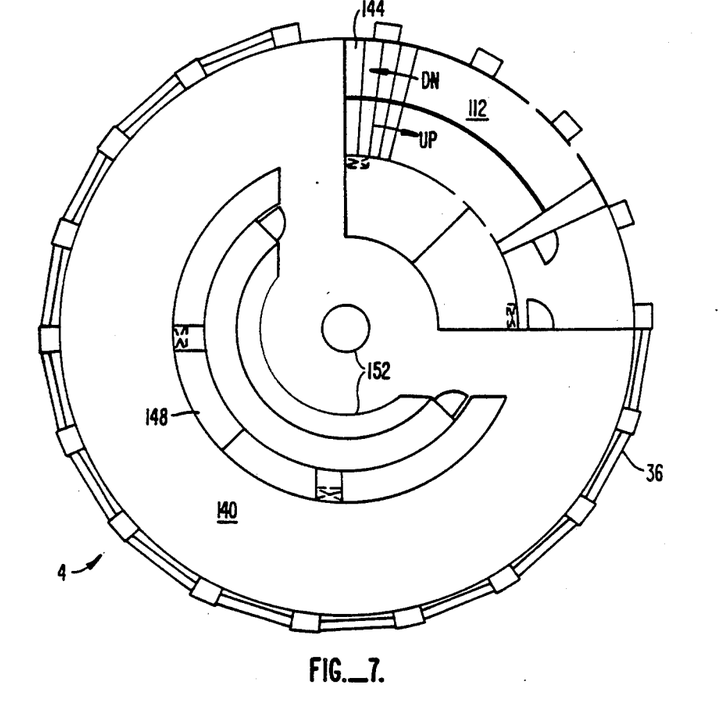
FIG. 7 is a plan cross-sectional view of the structure according to the invention taken along line 7—7 of FIG. 5.

FIG. 7 is a cross-sectional view of structure 4 showing bottom portion 116. As shown therein, walkway 112 is connected to a floor 140 by a lower staircase 144. Floor 140 preferably is substantially at the same level as underwater surface 8 and may be effected by embedding foundation 12 into underwater surface 8 so that the top of the foundation is substantially level with underwater surface 8. As a result, visitors looking through windows 36, while standing on floor 140, may view the underwater environment at substantially the same level as underwater surface 8, thus enhancing the viewing experience.

To further enhance the viewing experience, the underwater environment is simulated by disposing one or more aquariums coaxially within and spaced radially inward from housing 6. The aquariums extend upwardly and form with walkway 112 a wall and ceiling, respectively, defining with housing 6 and floor 140 a substantially enclosed passage extending a substantial length along the bottom of the housing. Aquariums 148 may contain various marine life forms and be appropriately lighted so that visitors walking along floor 140 believe that they are walking through a passageway located completely underwater. Finally, one or more sensory touch basins 152 may be disposed within the area bounded by aquariums 148 for providing samples of marine life, such as starfish, sea urchins, etc., for people to observe and touch.

CONSTRUCTION

Figure 8A:
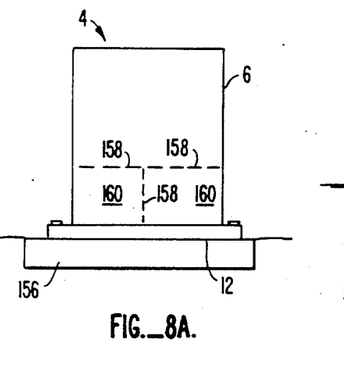
FIGS. 8A, 8B 8C and 8D are views illustrating a method of constructing the structure according to the present invention with the foundation of FIGS. 3A and 3B.

The method of construction depends upon the chosen form of foundation 12 and the type of body of water into which the structure is to be placed. In shallow areas, the structure may be constructed in place. However, the more common environment will be in relatively deep bodies of water, thus making in-place construction infeasible. For solid foundations and those shown in FIGS. 3a and 3b construction proceeds according to FIGS. 8a-8d. As shown in FIG. 8a, the housing 6 may be fabricated together with foundation 12 upon a submersible structure 156. Submersible structure 156 may be temporarily affixed to a dock (not shown) to facilitate access and construction. A plurality of partitions 158 are placed within housing 6 to form ballast chambers 160 for controlling the lowering of structure 4 to the underwater surface. There may be as many ballast chambers 160 as required for the particular application.

Figure 8B:
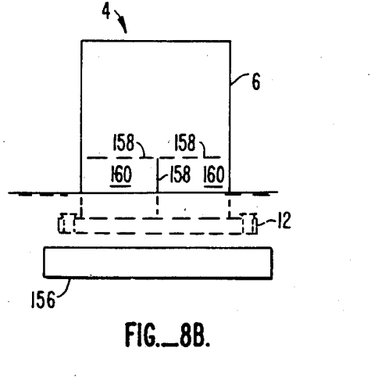
Figure 8C:
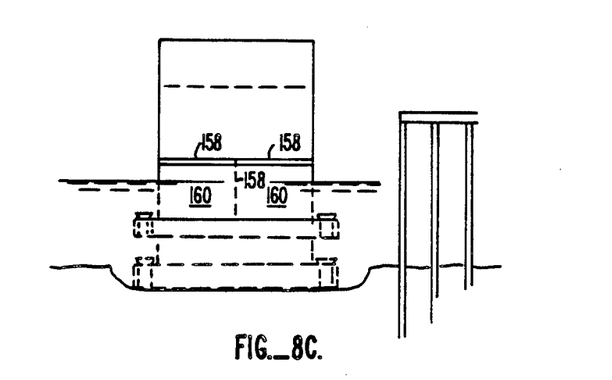

After the exterior structure is completed. submersible structure 156 is submerged as shown in FIG. 8b, and structure 4 floats as a result of the air in ballast chambers 160. One or more ballast chambers 160 may be partially or completely filled with water at this time to enhance stability of the structure if necessary. Structure 4 is towed to the desired site and then ballast chambers 160 are allowed to fill with water in a controlled manner so that the structure descends to the underwater surface, as shown by phantom lines in FIG. 8c. If the foundation illustrated in FIGS. 3a and 3b is used, pilings 78 are then driven through sleeves 72 by a suitable driver 156 into underwater surface 8 for affixing foundation 12. The water then may be pumped out from ballast chambers 160 by suitable pumping means. partitions 158 removed and the interior of structure 4 constructed according to known construction techniques.

Figure 9A:
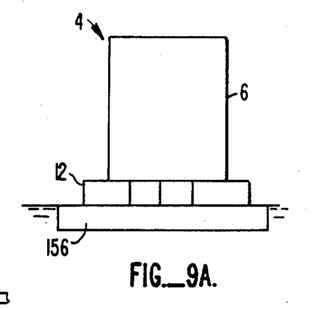
FIGS. 9A, 9B, and 9C are views illustrating a method of constructing the structure according to the present invention with the foundation of FIGS. 2A and 2B.
Figure 9B:
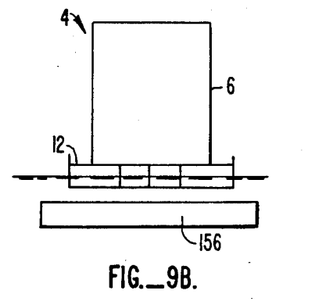
Figure 9C:
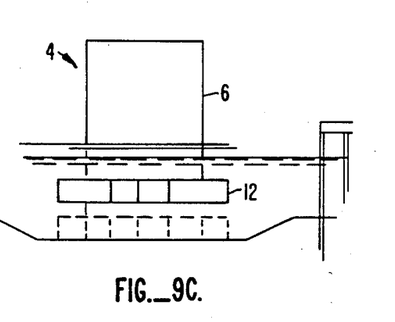

If the ballast-type foundations of FIGS. 2a, 2b, 4a, or 4b are used, construction proceeds according to FIGS. 9a-9c. As shown in FIG. 9a, housing 6 may be fabricated together with foundation 12 upon a submersible structure 156. In this embodiment, ballast chambers 64 (FIG. 2b) or 100 (FIG. 4b) are used for controlling the lowering of structure 4 to the underwater surface.

Figure 8D:
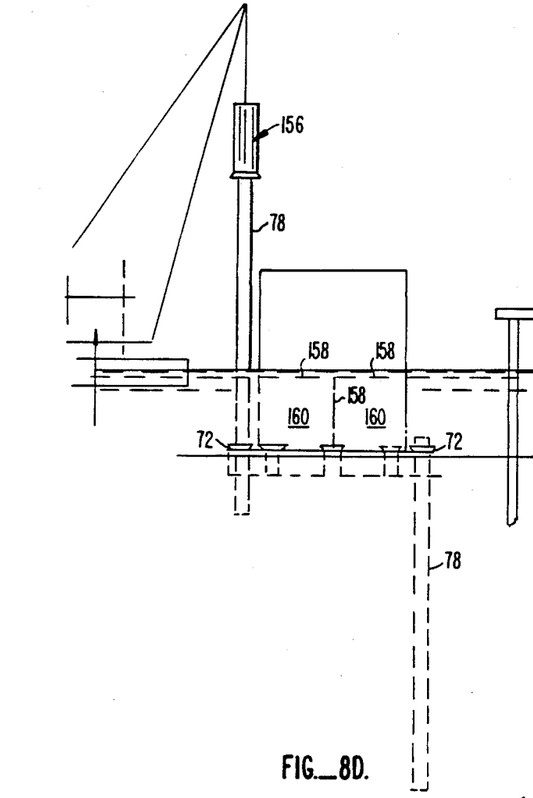

After the exterior structure is completed, submersible structure 156 is submerged as shown in FIG. 9b, and structure 4 floats as a result of the air in the ballast chambers. One or more ballast chambers may be partially or completely filled with a ballast material having a density greater than that of water at this time to enhance stability of the structure if necessary. Structure 4 is towed to the desired site, and then the ballast chambers are filled with ballast material in a controlled manner so that the structure descends to the underwater surface as shown in phantom lines in FIG. 8c. If the foundation illustrated in FIGS. 4a and 4b is used, pilings may be driven through foundation 12 and into the underwater surface 8 in the same manner as shown in FIG. 8d. The interior of the structure may then be constructed according to known construction techniques.

CONCLUSION AND ALTERNATIVE EMBODIMENTS

Figure 10:
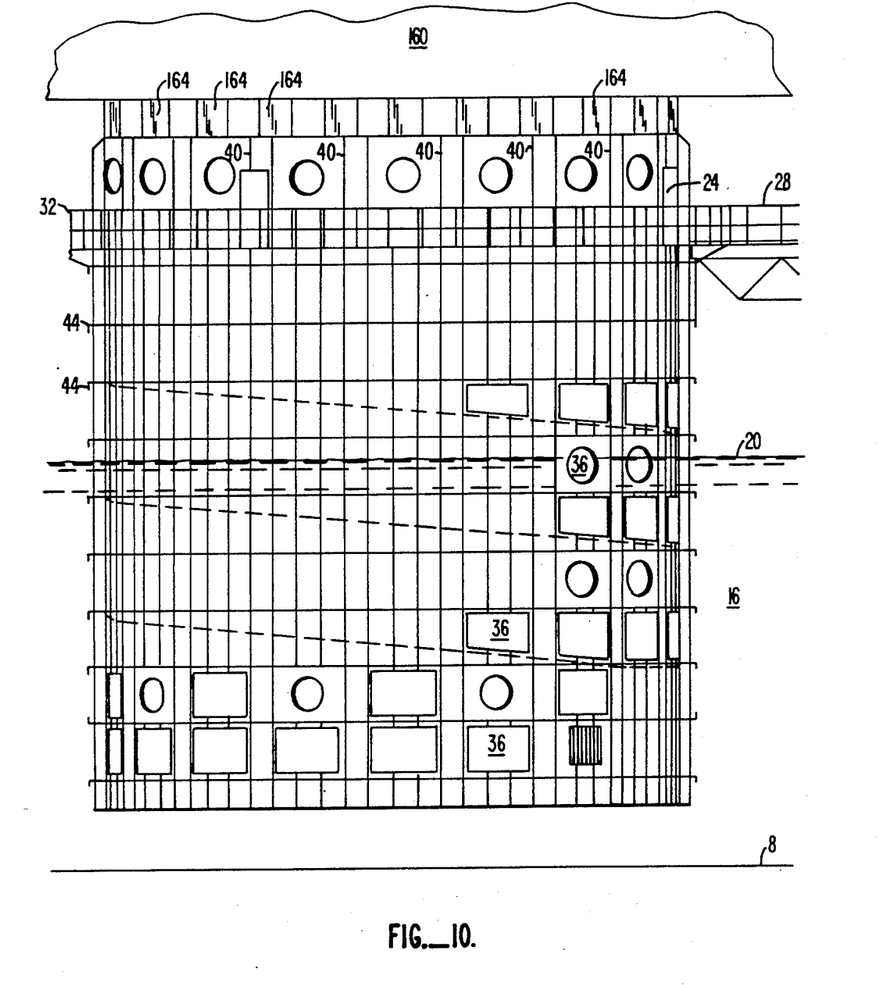
FIG. 10 is a side view of an alternative embodiment of a structure for observing a marine environment according to the present invention.

While the above is a complete description of a preferred embodiment of the present invention, various modifications may be employed. For example, if the bottom of the body of water is unsuitable for supporting the structure, the structure may be suspended as shown in FIG. 10 from an overhanging structure 160 using suitable hanging members 164. In another embodiment, aquariums 148 may extend all the way towards the top of housing 6, or they may be formed as one large cylindrical aquarium disposed inside of the spiral walkway 112 for simulating the underwater environment along the entire length of the walkway. In this embodiment, the buoyant tendency of structure 4 is substantially reduced and foundation 12 may be modified or omitted accordingly.

Figure 11A:
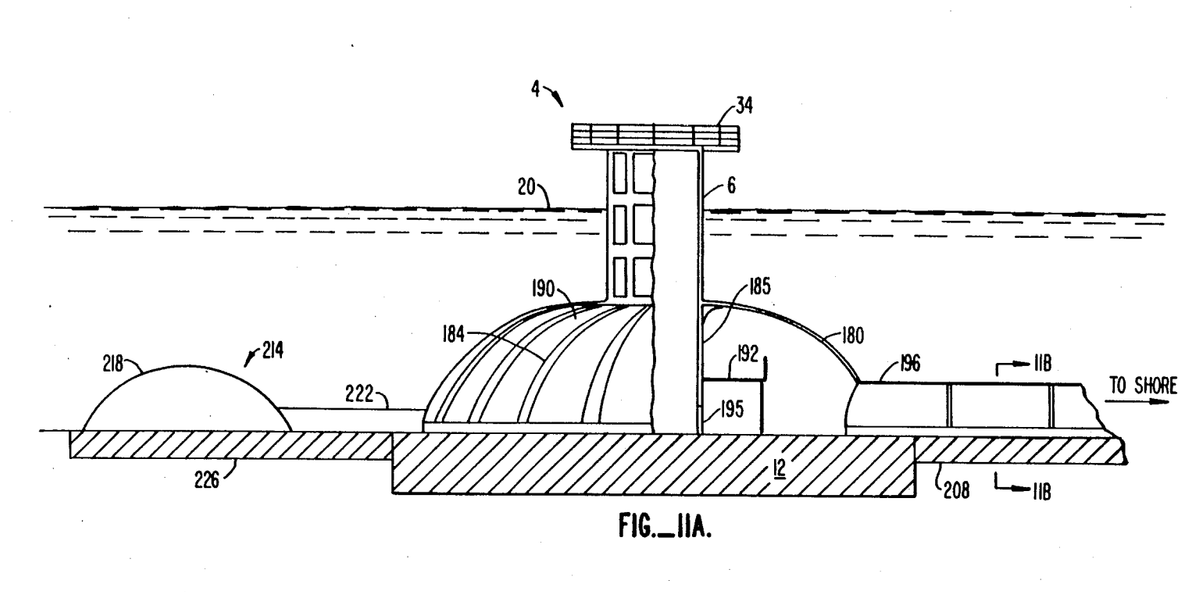
FIG. 11A is a side view of a third embodiment of a structure for observing a marine environment according to the present invention.
Figure 11B:
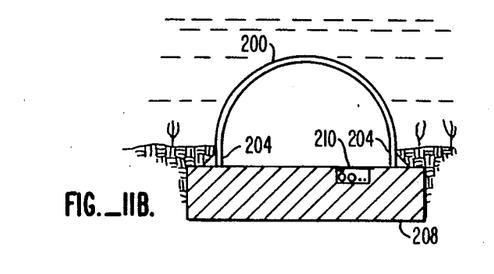
FIG. 11B is a cross-sectional view, taken along line 11B—11B of FIG. 11A, of the acrylic tunnel attached to the structure of FIG. 11A.

Another embodiment of structure 4 is illustrated in FIGS. 11A and 11B. As shown therein, a housing extension 180 is disposed on the side of housing 6, preferably at the bottom, and extends radially therefrom. In this embodiment, housing 6 may be constructed according to the embodiment shown in FIG. 1 or may serve as a ventilation and secondary exit structure in which case housing 6 may be of substantially decreased diameter.

Extension 180 comprises a plurality of arcuate ribs 184 extending arcuately upwardly from a point located on the bottom of the body of water (preferably on foundation 12) spaced apart from the housing to a point located on the housing above the bottom of the body of water. A transparent acrylic shell 190 is connected to each rib and arcuately extends therewith from the housing to the bottom of the body of water. Preferably, extension 180 is formed as a toroid extending along the perimeter of housing 6 so that visitors may walk in an interrupted path and view the underwater environment along the entire perimeter of the housing. Alternatively, if structural conditions permit, the lower portion 185 of housing 6 may be omitted in which case extension 180 has the shape of a substantially hemispherical shell. If desired, one or more observation balconies 192 may be disposed within extension 180. Because of transparent shell 190, a person disposed within extension 180 may view the underwater environment in a 90° vertical plane from directly overhead to the bottom of the body of water. Extension 180 preferably extends beyond the outer perimeter of housing 6 so that a person disposed in the housing may have an unobstructed view to the surface 20 of the body of water.

If housing 6 is constructed according to the embodiment of FIG. 1, then access to extension 180 may be through a door or passageway 195 located on the side of housing 6. However, if housing 6 serves only as an emergency exit or ventilation tower, then access to extension 180 is through a tunnel 196 which extends to the shore. In the embodiment shown, tunnel 196 is disposed at the bottom of the body of water, although tunnel 196 may be coupled to extension 180 in any manner desired.

As shown in FIG. 11B, tunnel 196 comprises a shell 200 which preferably is constructed of a transparent acrylic material. To maximize the viewing experience, substantially all portions of shell 200 which are exposed to the underwater environment are transparent. Preferably, shell 200 has a semi-circular crosssectional shape as shown in FIG. 11B so that a person walking through the tunnel has a substantially 180° unobstructed view in a vertical plane. Shell 200 is mounted to steel foundation walls 204 which in turn are mounted to a foundation 208. Foundation 208 may be constructed in the same manner as foundation 12, or it may comprise a simple concrete slab if conditions permit it. Foundation 208 also may include a utility conduit 210 for communicating utility services to structure 4. As with structure 4, tunnel 196 may be constructed on land, carried out to the desired location, sunk, and attached to extension 180.

Structure 4 maximizes the underwater viewing experience by creating an enveloping underwater environment for the people disposed inside. A particularly dramatic effect occurs when transparent shell 190 is relatively small, i.e., extending approximately 10 feet vertically and approximately 6 feet horizontally. In this case the enveloping underwater environment is substantially within arm's reach of the viewer. To further enhance the viewing experience, structure 4 may include a second extension 214 extending from housing 6 (or extension 180). Extension 214 comprises a housing 218 which preferably is constructed of a transparent acrylic material. Housing 218 is coupled to housing 6 or extension 180 through a tunnel 222. Tunnel 222 also may be constructed of a transparent material. As shown in FIG. 11A, housing 218 and extension 222 may be constructed on a much reduced scale so that support ribs such as ribs 184 of extension 180 are not required. In this manner, the users are essentially disposed within a transparent bubble which allows a substantially 180° unobstructed view in a vertical plane and a substantially 360° view in a horizontal plane. As with structure 4 and tunnel 196, housing 218 and tunnel 222 are constructed on a foundation 226.

From the foregoing, it is apparent that the scope of the invention should not be limited except as set forth in the claims.

I claimed:

1. A structure for observing an underwater environment comprising:
    a first housing affixed to a support and having a portion thereof disposed a substantial length below the surface of a body of water;
    a housing extension disposed on a side of the housing and extending outwardly therefrom into the underwater environment;
    means for receiving a person into the housing extension; and
    viewing means, disposed on the housing extension, for viewing the underwater environment from inside the extension, the viewing means including means for viewing the underwater environment above the extension, the viewing means being disposed beyond an outer perimeter of the housing for providing an unobstructed view to the surface of the body of water, the viewing means comprising:
        first and second ribs, each rib extending arcuately upwardly from a point located on the bottom of the body of water spaced apart from the first housing to a point located on the first housing above the bottom of the body of water; and
        a transparent shell connected to each rib and arcuately extending from the first housing to the bottom of the body of water.

2. The structure according to claim 1 wherein the extension comprises:
    a second housing spaced apart from the housing extension and disposed a substantial length below the surface of the body of water; and
    a tunnel connected to the second housing and the housing extension.

3. The structure according to claim 2 wherein substantially all portions of the second housing exposed to the underwater environment are constructed of a transparent material.

4. The structure according to claim 3 wherein substantially all portions of the tunnel exposed to the underwater environment are constructed of a transparent material.

5. The structure according to claim 3 wherein the second housing is disposed at the bottom of the body of water.

6. The structure according to claim 5 wherein the transparent portions of the second housing provide an uninterrupted view of approximately 180° in a vertical plane.

7. The structure according to claim 6 wherein the transparent portions of the second housing provide an uninterrupted view of approximately 360° in a horizontal plane.

8. The structure according to claim 5 wherein the second housing is generally hemispherical in shape.

9. The structure according to claim 1 wherein the extension is disposed at the bottom of the first housing.

10. The structure according to claim 9 wherein the extension forms a toroid encircling the perimeter of the first housing.

11. The structure according to claim 1 wherein the receiving means comprises a tunnel coupled to the first housing and being submerged in the body of water, the tunnel extending away from the first housing.

12. The structure according to claim 11 wherein the tunnel is substantially exposed to the underwater environment.

13. The structure according to claim 12 wherein substantially all portions of the tunnel exposed to the underwater environment are constructed of a transparent material.

14. The structure according to claim 13 wherein the tunnel has a generally semicircular cross-sectional shape.

15. The structure according to claim 14 wherein the transparent portions of the tunnel provide an uninterrupted view of the underwater environment of approximately 180° in a vertical plane.

16. The structure according to claim 1 wherein the first housing extends a substantial length toward the surface of the water.

17. The structure according to claim 16 wherein the first housing extends above the surface of the water.

18. The structure according to claim 17 further comprising a catwalk extending along an exterior perimeter of the first housing above the surface of the water.

19. The structure according to claim 18 wherein the first housing is a cylinder.

* * * * *